(12) United States Patent
Kishan et al.

(10) Patent No.: US 10,089,119 B2
(45) Date of Patent: Oct. 2, 2018

(54) API NAMESPACE VIRTUALIZATION

(75) Inventors: Arun Kishan, Bellevue, WA (US); Karthik Thirumalai, Sammamish, WA (US); Richard A. Pletcher, Redmond, WA (US); Bryan W. Fagan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 823 days.

(21) Appl. No.: 12/716,381

(22) Filed: Mar. 3, 2010

(65) Prior Publication Data

US 2011/0154378 A1  Jun. 23, 2011

Related U.S. Application Data

(60) Provisional application No. 61/288,202, filed on Dec. 18, 2009.

(51) Int. Cl.
  *G06F 9/46* (2006.01)
  *G06F 9/445* (2018.01)
  *G06F 9/448* (2018.01)

(52) U.S. Cl.
  CPC ........ *G06F 9/44521* (2013.01); *G06F 9/4486* (2018.02); *G06F 9/44536* (2013.01)

(58) Field of Classification Search
  CPC . G06F 9/44521; G06F 9/4426; G06F 9/44536
  See application file for complete search history.

(56) References Cited

U.S. PATENT DOCUMENTS 5,097,533 A   3/1992 Burger
5,339,422 A   8/1994 Brender
(Continued)

FOREIGN PATENT DOCUMENTS

CN    1513145 A    7/2004
CN    101233488 A  7/2008
(Continued)

OTHER PUBLICATIONS

R. Eggen, "Efficiency of Soap Versus JM"—Retrieved Date: Nov. 20, 2009 http://citeseerx.ist.psu.edu/viewdoc/download?doi=10.1.1.105.640&rep=rep1&type=pdf, 7 pages.
(Continued)

*Primary Examiner* — Brian W Wathen
*Assistant Examiner* — Carina Yun
(74) *Attorney, Agent, or Firm* — The Watson I.P. Group, PLC; Vladan M. Vasiljevic

(57) ABSTRACT

A computer operating system with a map that relates API namespaces to components that implement an interface contracts for the namespaces. When an API namespace is to be used, a loader within the operating system uses the map to load components based on the map. An application can reference an API namespace in the same way as it references a dynamically linked library, but the implementation of the interface contract for the API namespace is not tied to a single file or to a static collection of files. The map may identify versions of the API namespace or values of runtime parameters that may be used to select appropriate files to implement an interface contract in scenarios that may depend on factors such as hardware in the execution environment, a version of the API namespace against which an application was developed or the application accessing the API namespace.

18 Claims, 8 Drawing Sheets

(56) References Cited

U.S. PATENT DOCUMENTS

| | | | |
|---|---|---|---|
| 5,910,180 A | 6/1999 | Flory | |
| 6,446,137 B1 | 9/2002 | Vasudevan | |
| 6,691,302 B1 | 2/2004 | Skrzynski | |
| 6,813,770 B1 | 11/2004 | Allavarpu | |
| 6,993,744 B2 | 1/2006 | Hills | |
| 7,065,742 B1* | 6/2006 | Bogdan | 717/106 |
| 7,171,539 B2 | 1/2007 | Mansell | |
| 7,219,339 B1 | 5/2007 | Goyal | |
| 7,325,007 B2 | 1/2008 | Castro | |
| 7,330,971 B1 | 2/2008 | Kukreja | |
| 7,380,235 B1 | 5/2008 | Fathalla | |
| 7,444,621 B2 | 10/2008 | Pletcher et al. | |
| 7,458,082 B1 | 11/2008 | Slaughter | |
| 7,546,602 B2 | 6/2009 | Hejlsberg | |
| 7,546,607 B2 | 6/2009 | Demsey | |
| 7,581,231 B2 | 8/2009 | Smith | |
| 7,721,254 B2 | 5/2010 | Relyea | |
| 7,783,720 B1 | 8/2010 | Allavarpu | |
| 7,941,402 B2 | 5/2011 | Smits | |
| 7,966,622 B1* | 6/2011 | Purser et al. | 719/321 |
| 7,971,208 B2 | 6/2011 | Stokes | |
| 8,037,025 B2 | 10/2011 | Fang | |
| 8,250,524 B2 | 8/2012 | Barnett | |
| 8,595,714 B1 | 11/2013 | Hamer | |
| 8,776,094 B2 | 7/2014 | Cross | |
| 8,793,359 B1 | 7/2014 | Fiebig | |
| 9,110,770 B1 | 8/2015 | Raju | |
| 2001/0037417 A1 | 11/2001 | Meyer | |
| 2002/0161596 A1 | 10/2002 | Johnson | |
| 2003/0028685 A1* | 2/2003 | Smith et al. | 709/328 |
| 2003/0110312 A1* | 6/2003 | Gunduc et al. | 709/328 |
| 2003/0172196 A1* | 9/2003 | Hejlsberg et al. | 709/328 |
| 2003/0188043 A1 | 10/2003 | Woodall | |
| 2003/0191864 A1 | 10/2003 | Govindarajapuram | |
| 2004/0039827 A1* | 2/2004 | Thomas et al. | 709/228 |
| 2004/0049481 A1 | 3/2004 | Blevins | |
| 2004/0107416 A1 | 6/2004 | Buban | |
| 2004/0148586 A1* | 7/2004 | Gilboa | 717/108 |
| 2004/0201600 A1 | 10/2004 | Kakivaya | |
| 2004/0243605 A1 | 12/2004 | Bernstein | |
| 2004/0260691 A1 | 12/2004 | Desai | |
| 2005/0081184 A1* | 4/2005 | Deedwaniya et al. | 717/100 |
| 2005/0091671 A1 | 4/2005 | Deem | |
| 2005/0102129 A1 | 5/2005 | Bond | |
| 2005/0114832 A1 | 5/2005 | Manu | |
| 2005/0144591 A1* | 6/2005 | Banks | 717/122 |
| 2005/0182828 A1 | 8/2005 | Lamkin | |
| 2005/0262181 A1 | 11/2005 | Schmidt | |
| 2006/0004709 A1 | 1/2006 | Borthakur | |
| 2006/0161910 A1 | 7/2006 | Bonsteel | |
| 2006/0179146 A1* | 8/2006 | Marucheck et al. | 709/227 |
| 2006/0179440 A1 | 8/2006 | Besbris | |
| 2006/0215199 A1 | 9/2006 | Morita | |
| 2006/0230395 A1 | 10/2006 | Paul | |
| 2006/0277194 A1 | 12/2006 | Britt | |
| 2006/0287890 A1 | 12/2006 | Stead | |
| 2007/0039010 A1 | 2/2007 | Gadre | |
| 2007/0088710 A1 | 4/2007 | Song | |
| 2007/0124334 A1 | 5/2007 | Pepin | |
| 2007/0143501 A1* | 6/2007 | Pasha | G06F 8/30 709/246 |
| 2007/0156913 A1 | 7/2007 | Miyamoto | |
| 2008/0034381 A1 | 2/2008 | Jalon | |
| 2008/0066048 A1 | 3/2008 | Hafermann | |
| 2008/0082974 A1 | 4/2008 | Ellison | |
| 2008/0134156 A1 | 6/2008 | Osminer | |
| 2008/0134206 A1 | 6/2008 | Stokes | |
| 2008/0261689 A1 | 10/2008 | Evans | |
| 2009/0019380 A1 | 1/2009 | Tanaka | |
| 2009/0044170 A1 | 2/2009 | Bernardi | |
| 2009/0063562 A1 | 3/2009 | Dinger | |
| 2009/0125822 A1 | 5/2009 | Karatal | |
| 2009/0158238 A1 | 6/2009 | Jung | |
| 2009/0164973 A1 | 6/2009 | Barnett | |
| 2009/0187610 A1 | 7/2009 | Guo | |
| 2009/0199220 A1 | 8/2009 | Bahlke | |
| 2010/0057784 A1 | 3/2010 | Kapadia | |
| 2010/0058305 A1 | 3/2010 | Jones | |
| 2010/0275180 A1 | 10/2010 | Alex | |
| 2010/0299660 A1 | 11/2010 | Torgersen | |
| 2010/0299663 A1 | 11/2010 | Weissman | |
| 2010/0318968 A1 | 12/2010 | Traut | |
| 2011/0072424 A1 | 3/2011 | Choi | |
| 2011/0078674 A1 | 3/2011 | Ershov | |
| 2011/0153559 A1 | 6/2011 | Rangarajan | |
| 2011/0307869 A1 | 12/2011 | Cwalina | |
| 2012/0222025 A1 | 8/2012 | Pandit | |
| 2013/0042258 A1 | 2/2013 | Rector | |
| 2013/0055211 A1 | 2/2013 | Fosback | |
| 2013/0055291 A1 | 2/2013 | Pierson | |
| 2013/0282748 A1 | 10/2013 | Liensberger | |
| 2013/0338972 A1 | 12/2013 | Chao | |
| 2014/0181262 A1 | 6/2014 | Goswarni | |

FOREIGN PATENT DOCUMENTS

| | | |
|---|---|---|
| CN | 101344846 A | 1/2009 |
| CN | 101542436 A | 9/2009 |
| EP | 0 371 941 A2 | 6/1990 |
| EP | 1 526 451 A2 | 4/2005 |
| EP | 1 845 444 A1 | 10/2007 |
| EP | 2 088 506 A1 | 8/2009 |
| JP | 2006-216030 A | 8/2006 |
| TW | I365387 A | 6/2006 |
| TW | 200636567 A | 10/2006 |
| TW | 200805150 A | 1/2008 |
| WO | 2013/022465 A1 | 2/2013 |

OTHER PUBLICATIONS

R. Pandey et al., "Dynamically Evolvable Distributed Systems"—Retrieved Date: Nov. 20, 2009 http://homepages.cs.ncl.ac.uk/alexander.romanovsky/home.formal/dp10.pdf 3 pages.

S. Fulton III, Mark Russinovich on MinWin, the new core of Windows, Published Dec. 2, 2009, http://www.betanews.com/article/Mark-Russinovich-on-MinWin-the-new-core-of-Windows/1259792850 , printed Dec. 9, 2009.

Sandakly, "Distributed Shared Memory Infrastructure for Virtual Enterprise in Building and Construction", In the Journal of Intelligent Manufacturing, Apr. 2001.

PCT International Search Report and Written Opinion for Application No. PCT/US2011/055700, dated Sep. 28, 2012.

Nguyen, "A Framework for Diversifying Windows Native APIs to Tolerate Code Injection Attacks", In Proceedings of the 2nd ACM Symposium on Information, Computer and Communications Security, Mar. 20-22, 2007.

"Inside Windows Native API #1", Jul. 24, 2006.

"Building the Componentized Operating System in Microsoft Windows CE 2.1", Microsoft Corporation, Apr. 2000.

Ionescu, "Native Development Kit README", Published Online on or before Jan. 19, 2008.

PCT International Search Report and Written Opinion for Application No. PCT/US2011/055704, dated Sep. 19, 2012.

Kloss, "Source Code: Automatic C Library Wrapping—Ctypes From the Trenches", In the Python Papers Source Codes, Sep. 16, 2009.

Heidrich, "Automatic Generation of Tcl Bindings for C and C++ Libraries", In Proceedings of the Tcl/Tk Workshop, Jul. 1995.

Emery, "Standards, APIs, Interfaces and Bindings", Retrieved on May 5, 2011.

"Microsoft.SqlServer.Server Namespace", Published on or before May 5, 2008.

TW Search Report for Application No. 100136563, dated Sep. 9, 2015, Date of Research Jul. 21, 2015.

TW Search Report for Application No. 100136566, dated Oct. 21, 2015, Date of Research Oct. 15, 2015.

CN Second Office Action for Application No. 201210317710.8, dated Sep. 2, 2015.

(56) References Cited

OTHER PUBLICATIONS

JP Notice of Reasons for Rejection for Application No. 2014-524995, dated Aug. 25, 2015.
Stets, "Component-Based APIs for Versioning and Distributed Applications", Jul. 1999.
CN First Office Action and Search Report for Application No. 201210317739.6, dated Apr. 2, 2014.
CN Second Office Action for Application No. 201210317739.6, dated Oct. 22, 2014.
".NET Framework Developer's Guide, Interop Marshaling", Jun. 3, 2009.
".NET Framework Developer's Guide, Interoperating with Unmanaged Code", Jul. 17, 2009.
".NET Framework Tools, Type Library Importer", Jul. 7, 2009.
"Common Desktop Environment (CDE) 2.1", Retrieved May 5, 2011.
"Exposing COM Components to the .NET Framework", Nov. 2007.
"Introducing BEA Tuxedo", Retrieved May 5, 2011.
"Jason Description" Retrieved May 5, 2011.
"Overview of CORBA", In IEEE Communications Magazine on Environments, Feb. 1997.
"Contract Versions—Cloud Identity Client Developer Guide—API v2.0", Previously Published as 'RackspaceSupport Network', Mar. 11, 2012.
"Visual Basic Programming Guide: Introduction to COM Interop", May 28, 2009.
Henkel, "CatchUp! Capturing and Replaying Refactorings to Support API Evolution", In Proceedings of the 27th International Conference on Software Engineering, May 15, 2005.
Hamilton, "Language Integration in the Common Language Runtime", In Proceedings of the ACM Sigplan Conference on Programming Language Design and Implementation, Feb. 1, 2003.
Simon, "Full Eiffel on .NET", Published Online on or before May 18, 2006.
Stets, "Component-Based Operating System API: A Versioning and Distributed Resource Solution", Technical Report MST-TR-99-24, Jul. 1999.
PCT International Preliminary Report on Patentability, Search Report and Written Opinion for Application No. PCT/US2011/055492, dated Jul. 23, 2012.
EP Search Report for Application No. 11870789.2-1954 / 2742420 PCT/US2011055492, Reference M11707WOEP, dated Jan. 12, 2015.
EP Search Report for Application No. 11871602.6-1954 / 2751675 PCT/US2011055700, Reference M11706WOEP, dated Jan. 9, 2015.
CN First Office Action for Application No. 201210317710.8, dated Nov. 14, 2014.
EP Search Report for Application No. 11871395.7-1954 / 2751673 PCT/US2077055704, Reference M11705WOEP, dated Jan. 30, 2015.
Clark, "Calling Win32 DLLs in C# With P/Invoke", In MSDN Magazine, Jul. 2003.
Pietrek, "Avoiding DLL Hell: Introducing Application Metadata in the Microsoft .NET Framework", In MSDN Magazine, Oct. 2000.
CN Search Report for Application No. 201210317710.8, dated Oct. 17, 2014.
JP notice of Reasons for Rejection for Application No. 2014-528374, dated Oct. 27, 2015.
U.S. Appl. No. 61/288,202, filed Dec. 18, 2009, Kishan.
U.S. Appl. No. 13/223,296, filed Aug. 31, 2011, Pierson.
U.S. Appl. No. 14/244,951, filed Apr. 4, 2014, Pierson.
U.S. Appl. No. 13/223,291, filed Aug. 31, 2011, Pierson.
U.S. Appl. No. 13/207,806, filed Aug. 11, 2011, Rector.
U.S. Appl. No. 14/298,679, filed Jun. 6, 2014, Rector.
U.S. Appl. No. 13/912,444, filed Jun. 7, 2013, Rector.
U.S. Appl. No. 14/515,516, filed Oct. 16, 2014, Rector.
RU Notification on Results of Estimation of Patentability on Invention for Application No. 2014104582/08(007332), Communicated to US Counsel on Oct. 19, 2015, Oct. 15, 2015.
PCT International Search Report and Written Opinion for Application No. PCT/US2015/055193, dated Dec. 14, 2015.
Rackspace, "Versions", Cloud Identity Client Developer Guide, Mar. 30, 2012.
Chipperfield, "An introduction to cross-platform mobile development technologies", May 21, 2012.
Werner, "Developing Mobile Apps—compatible and platform independent", twago.com, Sep. 14, 2011.
Behrens, "Cross-Platform App Development for iPhone, Android & Co.—A Comparison I Presented at MobileTechCon", Oct. 11, 2010.
McKendrick, "Why API services need more inteligence to interact", May 23, 2014.
"API Index", Windows Dev Center, Published on or before Jun. 19, 2012.
"Supporting Different Platform Versions", Android Developers, Published on or before Apr. 23, 2012.
"Code Contracts", Microsoft, Published on or before Dec. 22, 2008.
Olson, "Reimaging App Development With the Windows Runtime", In MSDN Magazine: Windows 8 Special Issue, Oct. 15, 2012.
TW Decision of Patent Examination for Application No. 100136566, dated Jan. 29, 2016.
CN Third Office Action for Application No. 201210317710.8, dated Jan. 28, 2016.

\* cited by examiner

API NAMESPACE VIRTUALIZATION

RELATED APPLICATIONS

The application claim priority to U.S. Provisional Application No. 61/288,202, filed Dec. 18, 2009, entitled API Namespace Virtualization, incorporated herein in its entirety by reference.

BACKGROUND

Computers can be programmed to perform many types of important functions. Frequently, the programming is implemented as numerous software components that interact to yield a desired behavior for the computer.

The software components may be initially stored in some form of non-volatile memory, such as a hard disk. Such memory can provide persistent storage for a large amount of computer software and data used in operating a computer.

However, a conventional computer system traditionally does not execute software components directly from non-volatile memory. The non-volatile memory may be too slow to allow access to instructions and data as the computer operates. Accordingly, a conventional computer may "load" software components before they are executed so that they can use fast memory.

Frequently, some software is loaded each time a computer is powered up. However, not all software is loaded at power up. A computer may be programmed with more software than is used at one time. Accordingly, it is known to dynamically load software components. These components are stored as a file containing computer-executable instructions in a form that can be executed without compiling. These files also may be called "binaries" or "executables."

Loading is done by a component of an operating system, called a "loader." The loader performs multiple operations that are needed to make a binary ready for execution, including allocating fast memory to store computer-executable instructions that make up the binary. The loader may also trigger allocation of fast memory to store data accessed by the binary.

A binary may implement multiple functions, sometimes referred to as a library of functions. The functions implemented in a binary may be defined in an "interface contract." The interface contract defines application programming interfaces (APIs) that can be used to access the functions in the library. Other components may be said to "consume" the interface contract. Once the binary is loaded, the consuming components can access, or link to, all of the functions in the library by accessing the functions using interfaces defined in the interface contract. For this reason, a software component that is loaded in this fashion may be called a "dynamically linked library."

Because the interface contract for a component is known in advance, components consuming the interface contract can be written using APIs defined by that contract so that they can interact with the library. Each dynamically linked library may include an import address table that identifies other dynamically linked libraries that it consumes, which are sometimes referred to as dependent dynamically linked libraries. When one dynamically linked library is loaded, a loader may load the dependent binaries for that library. Though, a loader may defer loading dependent binaries until a later time, such as when the dependent binaries are actually accessed.

SUMMARY

Improved computer operation is achieved with a loader that can identify one or more executable components that collectively implement an API namespace representing a predefined collection of functions. The API namespace may have an interface contract, similar to an interface contract for a dynamically linked library. Applications and other components may reference the API namespace in the same way that a dynamically linked library may be referenced. However, the loader may use a map to identify and load the component or components that contain functions that collectively implement the API namespace, providing access to the functions in the API namespace.

The implementation of the API namespace is not tied to a particular dynamically linked library, allowing flexibility in the manner in which the functions are implemented and flexibility in the manner in which dynamically linked libraries are maintained. That flexibility is achieved without unacceptable degradation of system performance.

A loader that can map an API namespace to components also enables functions within the namespace to be implemented in different ways depending on runtime conditions. The loader may identify a component to implement functions within the API namespace based on one or more parameters, at least some of which may be parameters identifying runtime conditions. Those parameters, for example, may indicate a hardware environment. As a result, an application program calling the API namespace need not be coded differently to provide different behaviors in different hardware environments. The application program can access functions using the same interface contract, regardless of environment. Yet, when a function is called, the appropriate behavior for the function may be achieved because the component selected by the loader implements the function as is appropriate for the environment.

A loader that can map an API namespace to components also may avoid compatibility issues that could otherwise arise as the components implementing functions within the API namespace are upgraded or otherwise modified. The loader may recognize versioning of namespaces and may allow an application program to identify a specific version against which the application was developed and tested. The loader may use the version information as another parameter on which selection of appropriate components to load may be based. The loader may include a mapping that identifies an updated version of a component when that component implements functions in the API namespace with the same behaviors as the versions against which a calling component was implemented. If a current version of a component has different behaviors, the loader may load a prior version of the component.

A loader that can map an API namespace to components also may support partitioning of an operating system or other framework into dynamically linked libraries that may be relatively easily maintained. The dynamically linked libraries also may be grouped in different ways to form different configurations of the framework, with greater or lesser functionality. In some embodiments, the dynamically linked libraries may be implemented in layers, with each layer depending only on dynamically linked libraries in lower layers. As a result, a different configuration may be formed by adding or removing layers, with each layer adding to or modifying the behavior of functions at the lower layers. Such a result may be achieved by implementing an API namespace, with the same interface contract, at more than one layer. The loader may resolve an indication that the API namespace is to be used to components at one of the layers that is present in the configuration.

For any configuration, the loader may use a redirection map to implement chaining so that components at higher layers can rely on the implementation in the lower layers without knowledge of the location of components that implement the specific contract. An indication that the API namespace is to be loaded may be first resolved to one or more dynamically linked libraries at the highest layer that implements an interface contract for that namespace. If the dynamically linked libraries at that layer rely on a dynamically linked library at a lower layer, a subsequent indication to load components implementing the API namespace, coming from within the higher layer, may result in the loader resolving the API namespace to the dynamically linked library at a lower layer that implements it. This process can continue indefinitely for several such layers.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
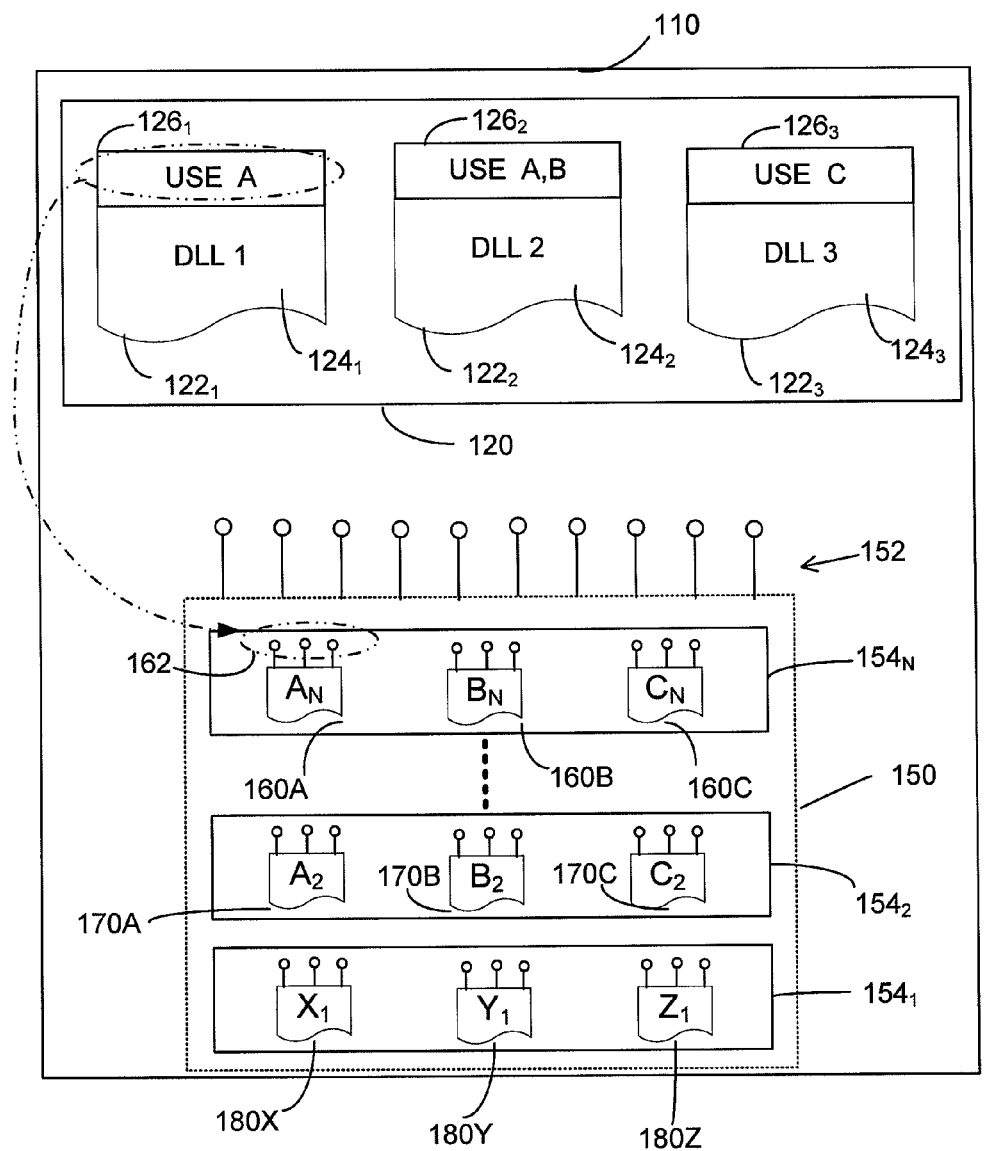
FIG. 1 is a block diagram of the architecture of a computer system in which embodiments of the invention may operate.

The inventors have recognized and appreciated that efficiency and flexibility of an operating system or other framework in a computer system is achieved by providing a loader that can dynamically select components to implement an interface contract against which an application or other component consuming that interface contract was developed. A set of components to implement the interface contract may be selected based on a map that identifies the set of components that collectively provide functions that fulfill the interface contract. Likewise, multiple disparate components may be implemented by the same component to improve operating system efficiency. The interface contract is therefore decoupled from the way in which functions specified in the interface contract are packaged into components.

Accordingly, the functions that implement the interface contract may be distributed across components in a way that achieves other objectives without requiring changes in development of the components that consume the interface contract. As an example, the functions may be grouped into components of an efficient size. The inventors have recognized that, though substantial flexibility could be achieved by implementing a framework with numerous components, each implementing one or a small number of functions, such a grouping would result in components of the framework being of an inefficient size. As each component is loaded, it is allocated computer resources, such as memory. Resources, such as memory and disk, may be allocated in discrete units. Memory, for example, may be allocated in pages. Each component is unlikely to use exactly the amount of resources in a discrete unit, creating wasted resources for each component loaded. If there are more components, the total amount of resources wasted may increase. Decoupling the functions in an interface contract from the components implementing those functions may achieve the same flexibility, but with more efficient use of computer resources.

As another example, with this flexibility, different configurations of a framework, such as an operating system, may be easily created. The framework may be partitioned into multiple layers, each of which depends only on a lower layer. A lightweight version of the framework may be created by removing higher layers and adjusting the map to identify components in lower layers that implement the functions of the interface contract. Conversely, functions of the framework may be altered or augmented by adding layers and adjusting the map to identify components in the higher layers instead of components in the lower layers.

The behavior of the framework in implementing functions defined by the interface contract may be changed by changing the mapping to components that implement an interface contract. These changes may be based on changing a map before it is loaded into a computer. Alternatively or additionally, the changes may be based on changing entries in the map while the framework is executing. As a further alternative, the changes may be based on applying parameter values recorded in the map to identify different relationships under different conditions. The map, for example, may record values for runtime parameters that indicate a configuration of a runtime environment on a computer executing the framework, allowing the same interface contract to be implemented by different components in different runtime environments.

As another example, the map may record version information associated with the framework, allowing the same interface contract to be implemented by different components, depending on the version of the framework for which components consuming the interface contract were developed. Support for versioning may provide desirable behavior in operation of the computer system. A version of an interface contract may be a superset (adding new interfaces) or safe implementation changes with no new interfaces, for instance. The map could point both versions of the contract to the same implementation library so most applications get the benefit of the new implementation (in the latter scenario). As yet another example, the map may record caller information, allowing the same interface contract to be implemented by different components for different consuming components, allowing overloaded interfaces to be chained.

Such a loader may be incorporated in any suitable computer system. FIG. 1 illustrates a software architecture of a computer system 110 that may incorporate embodiments of the invention. The architecture of FIG. 1, and other architectures discussed below, may be implemented using techniques as are known in the art or in any other suitable way. The components illustrated, for example, may be implemented using computer-executable instructions recorded on one or more computer-readable media. The system may include one or more processors that may execute those computer-executable instructions.

The software architecture of FIG. 1 may be regarded as a static architecture—identifying software components that may be present and available for executing on computer system 110. However, it should be recognized that not all of the illustrated components will be loaded for execution simultaneously. As is known in the art, some of the illustrated components may be loaded upon initialization of computer system 110, such as when it is powered up. Others of the components may be loaded in response to an event, such as user input requesting that application 120 be launched. Yet others of the components may be loaded in response to events occurring during execution of other components. Techniques for loading software in response to such events are known in the art and these techniques, or any other suitable techniques, modified as described below to incorporate a mapping to implement an API namespace, may be used.

In the embodiment illustrated in FIG. 1, the software architecture of computer system 110 includes an application 120 and an operating system with operating system configuration 150. The software architecture may include multiple applications and other components. However, for simplicity FIG. 1 shows only one application and an operating system.

Both application 120 and operating system 150 may contain multiple components. In the example illustrated, these components are implemented using techniques as are known in the art, and may sometimes be referred to as dynamically linked libraries, binaries or executables. In the example of FIG. 1, application 120 is shown to contain three components, illustrated as dynamically linked libraries $122_1$, $122_2$, and $122_3$. As is known in the art, when application 120 is launched in computer system 110, one or more of the dynamically linked libraries making up application 120 may be loaded for execution.

A dynamically linked library may contain multiple portions containing different types of information needed for computer system 110 to execute functions encoded in the dynamically linked library. In this example, each dynamically linked library is shown to contain a code portion and a dependency portion. For example, dynamically linked library $122_1$ is shown to contain a code portion $124_1$ and a dependency portion $126_1$. Likewise, dynamically linked library $122_2$ is shown to contain a code portion $124_2$ and a dependency portion $126_2$. Dynamically linked library $122_3$ is shown to contain a code portion $124_3$ and a dependency portion $126_3$.

The code portion of each of the dynamically linked libraries may contain computer-executable instructions that may be executed by one or more processors (not shown) of computer system 110. The dependency portion of each dynamically linked library may identify other dynamically linked libraries on which the dynamically linked library may depend for proper operation. In the embodiment illustrated, each of the dynamically linked libraries $122_1$ . . . $122_3$ in application 120 depends on dynamically linked libraries within operating system 150. Dependency information may be captured in any suitable way. It should be appreciated that, though FIG. 1 illustrates that the code portion and the dependency portion of each dynamically linked library is physically separate, there is no requirement that the code and dependency information be stored in computer-readable media in any specific format.

In a conventional computer system, the dependency portion of dynamically linked libraries within application 120 may be implemented as an import address table identifying dependent dynamically linked libraries by name. A similar organization of dependency information may be used according to some embodiments of the invention. However, in accordance with embodiments of the invention, some or all of the dependency information may be specified by identifying an API namespace against which the code in the associated code portion was developed. The dependency portion, for example, may identify one or more API namespaces that define interfaces to functions called from within code in the code portion.

In operation, the dependency information may signify to a loader that dependent dynamically linked libraries should also be loaded to support execution of a dynamically linked library. For example, dependency information in dependency portion $126_1$ indicates that dynamically linked library $122_1$ depends, for operation, on a namespace A. That namespace may be implemented by one, or more, dynamically linked libraries within operating system 150, which are loaded when dynamically linked library $122_1$ is loaded such that instructions within code portion $124_1$ may access functions implemented by the namespace.

To support such accessing of functions provided by a dynamically linked library, each dynamically linked library may implement an "interface contract." The interface contract contains information defining the interfaces through which consuming components may access functions performed by that dynamically linked library. Such interface contracts are known in the art and an interface contract may be identified using known techniques or in any other suitable way. For example, an interface contract may be reflected in a header file associated with the dependent dynamically linked library in a development environment. Through a process of compiling the dynamically linked library and loading it, the information in the header file may be translated into programming interfaces upon which other components may place calls when the dynamically linked library is loaded for execution.

In the example of FIG. 1, dynamically linked library $122_1$ is indicated to consume namespace A. Namespace A, in this example, may be mapped to dependent dynamically linked library 160A within the operating system in the operating system configuration 150 illustrated in FIG. 1. In this case, dependent dynamically linked library 160A is shown to implement an interface contract 162. In this simplified example, interface contract 162 is shown to contain three interfaces, signifying that dynamically linked library 160A may perform three functions. It should be appreciated that three interfaces within interface contract 162 are illustrated for simplicity, but an interface contract may contain any number of functions. These three interfaces provide the full set of interfaces specified in namespace A and namespace A, in the example illustrated, maps only to one component within the operating system, but such a one-to-one relationship between name spaces and components is not a requirement of the invention.

FIG. 1 illustrates that dynamically linked libraries may consume more than one API namespace. Though dynamically linked library $122_1$ and $122_3$ each are shown to consume a single namespace, dynamically linked library $122_2$ is shown to consume two API namespaces. In this case, dynamically linked library $122_1$ consumes namespace A, which is shown in the example of FIG. 1 to be mapped to dependent dynamically linked library 160A. Dynamically linked library $122_3$ is shown to consume namespace C. In the example of FIG. 1, namespace C is mapped to dependent dynamically linked library 160C. Dependency portion $126_2$ identifies namespaces A and B, which may be mapped to dependent dynamically linked libraries 160A and 160B, or any other components.

Figure 2:
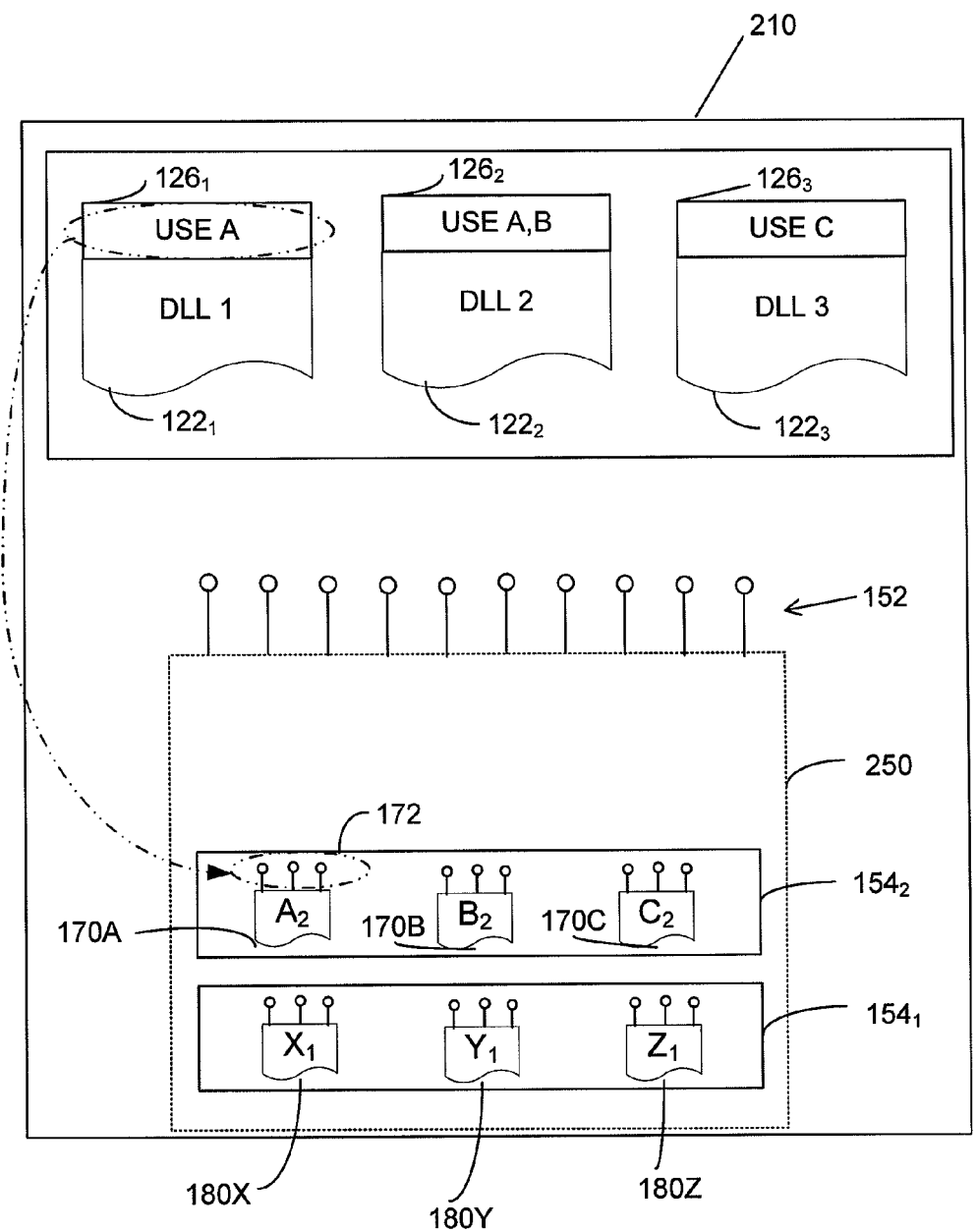
FIG. 2 is a block diagram of an alternative architecture of a computer system in which embodiments of the invention may operate.

FIG. 1 shows a software architecture for one configuration of a computer system, with one possible mapping between namespaces and components. A comparison of FIGS. 1 and 2 illustrates flexibility that may be achieved in a system in which the dependent dynamically linked libraries that implement functions in namespaces referenced by applications can be remapped. In the example of FIG. 1, the operating system is shown with an operating system configuration 150 that has multiple layers, of which layers $154_1$, $154_2$ ... $154_N$ are shown. In this example, the layers are hierarchical, with each higher level layer only depending on components in lower level layers. For example, components within layer $154_1$, in this case dynamically linked libraries 180X, 180Y and 180Z, are the lowest level and therefore do not depend on other dynamically linked libraries. Dynamically linked libraries in layer $154_2$, in this case dynamically linked libraries 170A, 170B and 170C, may depend on dynamically linked libraries in layer $154_1$ because it is at a lower level. However, the dynamically linked libraries in layer $154_2$ do not depend on dynamically linked libraries in layer $154_N$ and any dynamically linked libraries in any layers between layer $154_2$ and $154_N$. With this hierarchical approach, layers may be added or removed to add, alter or remove functionality of the operating system to configure the operating system to provide desired behaviors of the operating system in different environments.

In the embodiment illustrated, regardless of how many of the layers $154_1$ ... $154_N$ are present within operating system 150, the layers that are present may collectively contain components exposing application programming interfaces to provide an operating system interface set 152. In this way, an application, such as application 120, may be written to interact with an operating system through interfaces as defined by operating system interface set 152, regardless of the number of layers included in the configuration of operating system 150. If different layers are present, different components may execute the functions invoked through operating system interface set 152. When a function is called from within a component of an application, the dependent dynamically linked library within the operating system that actually executes that function may depend on a mapping specified for namespace containing that function.

For example, if layer $154_N$ is present, a function within API namespace A may be executed by code within dependent dynamically linked library 160A because, in the example of FIG. 1, namespace A is mapped to dependent dynamically linked library 160A. FIG. 2 illustrates that, if a different operating system configuration 250 is present, the mapping from component A to a dependent dynamically linked library may be changed. In the scenario shown in FIG. 2, operating system configuration 250 contains only layers $154_1$ and $154_2$. These layers still implement the operating system interface set 152. Accordingly, application 120 may still execute in computer system 210. However, when a loader resolves dependency information in the dynamically linked libraries of application 120, it loads dependent binaries in layer $154_2$ rather than those in layer $154_N$ (FIG. 1). For example, reference to namespace A in dependency portion $126_1$ may be resolved to dependent dynamically linked library 170A. Of course, it should be appreciated that the dependent binaries do not need to exist in the top most layer and do not need to exist all in the same layer. For example, in some implementations, the highest layer containing some of the components implementing an interface contract of a namespace could be layer $154_2$ while the highest layer for others may be layer $154_1$. In this scenario, the map may resolve the namespace to components in layers $154_2$ and $154_1$, even if a higher layer $154_N$ is present.

For dynamically linked library $122_1$ to function correctly, regardless of number of layers of the operating system present, dependent dynamically linked library 170A may implement an interface contract 172 that may be the same as interface contract 162. Accordingly, application 120 may be written against an interface contract specified by namespace A, corresponding to interface contract 162 or 172, though the actual components implementing the functions in that interface contract may be different depending on the environment in which the application executes. The specific components executing in each environment may depend on the map linking the namespace to components implementing the functions included in the interface contract for that namespace.

As an example of how this flexibility may be useful, one of the functions in namespace A may require authorization from a human before the function is completed. Though such a function may be performed in multiple different environments, the manner in which authorization is obtained may depend on the specific environment, requiring different behaviors for the function in different environments. For an operating system executing on a stand-alone computer, authorization may be obtained by presenting a dialog box on a display of the computer and requesting user input. In an enterprise environment, however, authorization may be obtained by accessing an access control list maintained by a network administrator. Operating system configuration 150 may represent the operating system in the enterprise environment. In contrast, operating system configuration 250 may represent the operating system as configured for use in a stand-alone computer. The function requiring authorization may be invoked from within code portion $124_1$ of dynamically linked library $122_1$ using a function call based on an interface within namespace A.

In the scenario in FIG. 1 with operating system configuration 150, namespace A is mapped to dynamically linked library 160A within layer $154_N$. Executable code within dynamically linked library 160A may implement that function by accessing the appropriate access control list created by a network administrator. However, in a computer system 210 with operating system configuration 250 as illustrated in FIG. 2, the same function call, because namespace A is mapped to dynamically linked library 170A in layer $154_2$, the function, when called, will be implemented by code within dynamically linked library 170A. That code may present a user interface on the display screen of computer system 210 (not shown). In this way, the same application program may perform appropriately regardless of the environment in which it is executed by changing the mapping of a namespace against which the application was developed.

Figure 3:
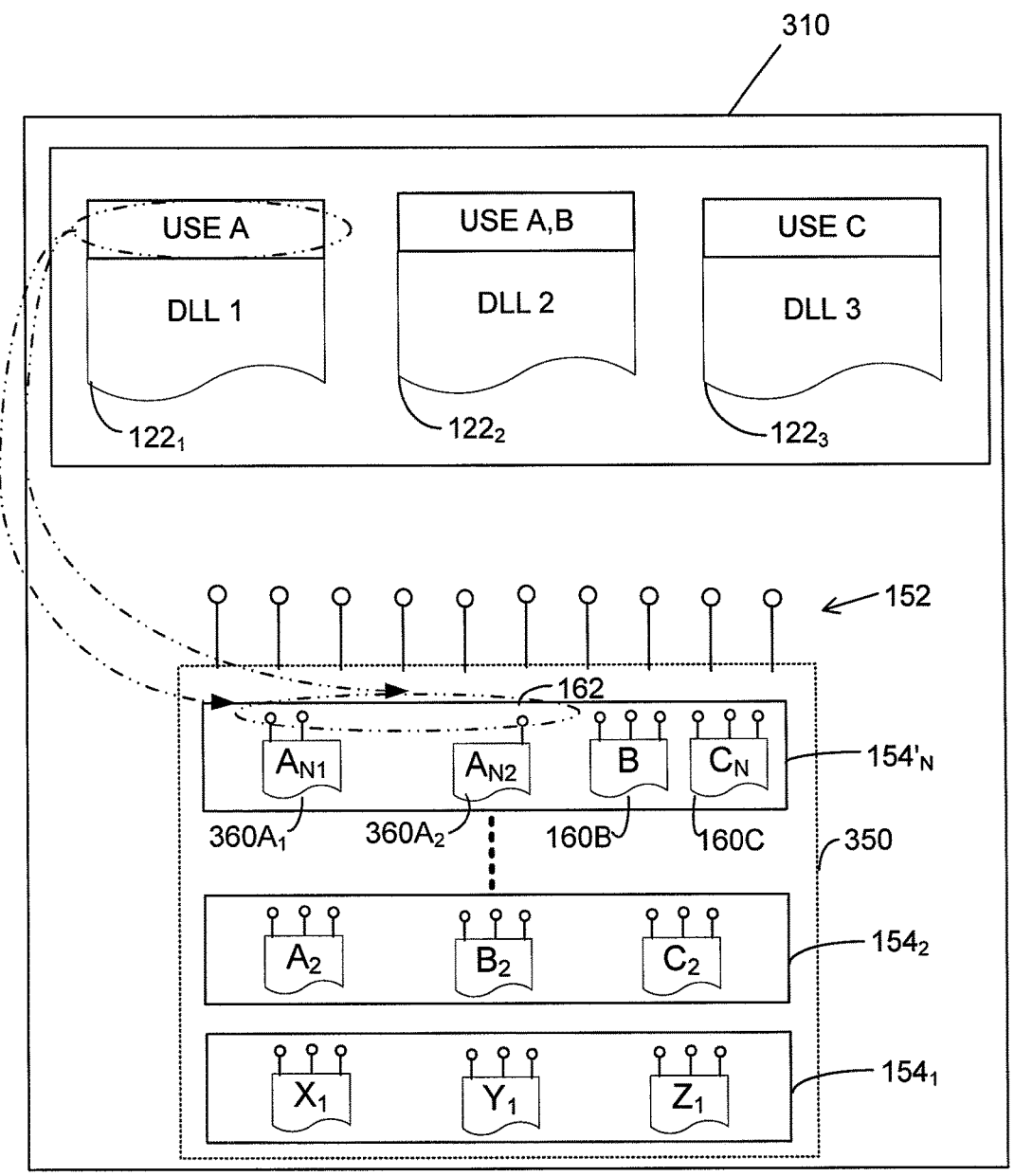
FIG. 3 is a block diagram of a further alternative architecture of a computer system in which embodiments of the invention may operate.

FIG. 3 illustrates a further scenario in which it is advantageous to have the flexibility provided by a mapping between a namespace and one or more components that implement the interface contract of that namespace. FIG. 3 illustrates a computer system 310 that includes an operating system configuration 350. Operating system configuration 350 is similar to operating system configuration 150 (FIG. 1), except that layer $154_N$ has been replaced by $154'_N$. Layer $154'_N$ includes components that implement the same functions as the components within layer $154_N$ (FIG. 1). Accordingly, operating system configuration 350 presents the same operating system interface set 152. However, as can be seen by a comparison of operating system layer 154N and 154'$_N$, dynamically linked library 160A (FIG. 1) has been replaced by dynamically linked libraries 360A$_1$ and 360A$_2$.

Dynamically linked libraries 360A$_1$ and 360A$_2$ form a set that may collectively implement interface contract 162. Accordingly, in the scenario of FIG. 1, when execution of application 120 results in accessing functions defined by API namespace A, different components may be loaded based on the map present in the computer system. In the scenario illustrated in FIG. 1, an indication to load components that implement the interface contract of namespace A results in a determination that component 160A is to be loaded. In contrast, in the scenario in FIG. 3, an indication that components implementing namespace A results in dynamically linked libraries 360A$_1$ and 360A$_2$ being identified and loaded.

As can be seen by a comparison of FIGS. 1 and 3, the interface contract associated with an API namespace has been decoupled from the components that implement the functions specified by the interface contract. In each case, dynamically linked library 122$_1$ uses the interface contract 162 identified by namespace A. Yet, in different scenarios this reference to a namespace is resolved to a different set of dynamically linked libraries. As another example of decoupling the namespace and the components that implement it, multiple API namespaces may resolve to the same component. Such an embodiment, for example, may provide less flexibility in reconfiguring the framework, but may provide improved performance of the framework because that component may be better optimized.

Figure 4:
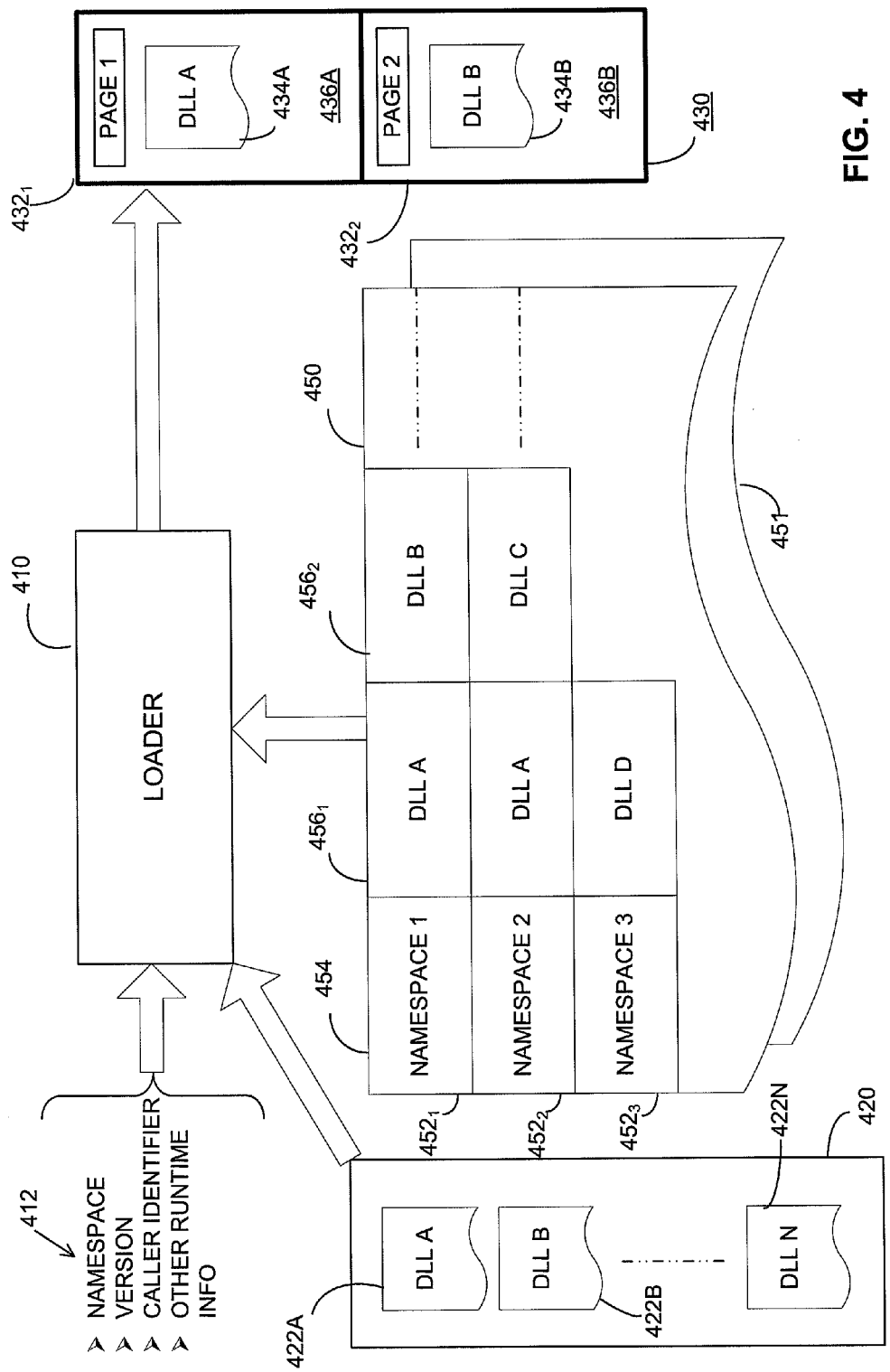
FIG. 4 is a block diagram showing loading of components according to some embodiments of the invention.

FIG. 4 illustrates portions of a computer system that may resolve an API namespace to a set of dependent binaries, which are then loaded. In this example, these functions are performed by a loader within an operating system. Such a loader may be constructed using techniques as are known in the art. However, rather than operate based on an indication that a dependent dynamically linked library is to be loaded, as is conventional, loader 410 alternatively or additionally operates on an indication that an API namespace is to be loaded.

Accordingly, loader 410 receives as input parameters 412 that provide an indication that an API namespace is to be loaded. Such an indication may be generated in any suitable way, such as a part of initializing a computer system, in response to an indication that an application should be launched or in response to operations performed within a component that is already loaded and executing.

Parameters 412 may be any suitable parameters and may be in any suitable format. In the example of FIG. 4, parameters 412 include an identifier for the API namespace to be loaded. The parameters 412 may include an identifier for the version of the API namespace against which a component triggering loading of the API namespace was coded. For example, dependency portions 126$_1$ . . . 126$_3$, in addition to identifying the API namespace, may identify a version assigned to a specific set of dependent dynamically linked libraries that implemented that API namespace at the time the respective dynamically linked libraries 122$_1$ . . . 122$_3$ were coded.

As the dependent dynamically linked libraries are changed, the version identifier may change. A numbering scheme may be adopted for the version identifier to differentiate between major and minor changes. However, any suitable mechanism may be used to identify versions of the set of components that implement an API namespace.

Any other suitable parameters may be provided as inputs to loader 410. The parameters, for example, may include an identifier of the caller. In this case, the caller refers to a component that depends on the API namespace and has triggered the loading of the API namespace. In the example of FIG. 1, dynamically linked library 122$_1$ is the caller for the API namespace A when namespace A is loaded to support calls from functions made from within dynamically linked library 122$_1$.

Other types of information may also be provided as input parameters for loader 410. This information could include, for example, a hardware configuration, a software configuration or any other suitable runtime information.

Loader 410 may use the input parameters 412 to access a map to identify a set of components that collectively implement the functions contained within the API namespace identified in parameters 412. Here a map 450 is illustrated. Map 450 may be implemented as a data structure stored in memory within a computer system. In the example of FIG. 4, map 450 is implemented as a data structure with multiple rows, of which three rows, 452$_1$, 452$_2$ and 452$_3$ are shown. Each of the rows maps a namespace to a set of components that collectively implement a namespace associated with the row. In the example of FIG. 4, three rows are shown for simplicity, but any number of rows may be included in map 450.

In the example of FIG. 4, map 450 contains multiple columns, of which columns 454, 456$_1$ and 456$_2$ are shown. Each column includes information of a specific type used by loader 410 to resolve a namespace to a set of components. Column 454 contains an identifier of a namespace. In operation, loader 410 matches a namespace identified in input parameters 412 to a row in map 450 based on the values in column 454.

The remaining columns, here illustrated as columns 456$_1$ and 456$_2$ contain identifiers for components that implement the namespace identified in each row. Here, two columns, 456$_1$ and 456$_2$, are shown for simplicity. However, any suitable number of columns may be included in map 450, allowing any suitable number of components to be associated with a namespace through map 450.

Map 450 may be created in any suitable way. In this example, map 450 provides information relating to namespaces supported by a framework, such as an operating system. Accordingly, the information in map 450 could be collected at the time a configuration of an operating system is developed. A tool, for example, may scan the code base for the operating system, collecting references to namespaces and identifying the components that implement functions identified in the interface contract for each namespace. Though other approaches for obtaining this information may also be used. For example, implementation of a namespaces may be declarative, meaning that a component may declare that it implements a particular namespace contract.

Regardless of how created, the map may then be supplied to computer users in conjunction with the operating system, such that users receiving different configuration of the operating system will receive a map with different information, mapping the same API namespaces to different sets of components. Alternatively or additionally, map 450 may be supplied to a computer user as part of a patch that updates an operating system. As an example of another possible variation, the map may be built or altered dynamically, with vendors that supply software that either consumes specific namespaces or supports additional or alternative namespaces, providing an executable component or other mechanism that modifies or extends the map.

It should be appreciated that the rows and columns of map 450 are a schematic representation of organization of information, indicating graphically related information that may be used to relate components to a namespace. Any suitable organization of information may be used. For example, map 450 may be stored as a schema in any suitable format, such as in an XML file or a database.

Regardless of how map 450 is created or stored, in operation, loader 410 identifies based on the input parameters 412 and map 450 components to implement a namespace to be resolved under the current runtime conditions. Once loader 410 identifies the components associated with a namespace to be resolved, loader 410 may load those components using techniques as are known in the art. However, any suitable technique for loading executable components may be used.

In the example of FIG. 4, the computer system includes nonvolatile memory 420 in which multiple dynamically linked libraries 422A, 422B . . . 422N are stored. Each of the dynamically linked libraries may be stored as a separate file or with any other suitable organization.

Regardless of how the components are stored, when loader 410 resolves a namespace identified in parameters 412 to a set of components, it obtains those components from nonvolatile memory 420. Loader 410 then creates memory structures in fast memory 430 and otherwise triggers action that makes the components ready for execution. Fast memory 430, for example, may be RAM or other suitable memory within a computer system. Any suitable memory structures may be created for each component to be loaded. The memory structures created in fast memory 430 may be memory structures as are known in the art. In this example, loader 410 creates a space in fast memory 430 for each component to be loaded that contains one or more pages. In this example, pages $432_1$ and $432_2$ are shown, each containing information associated with one loaded component.

The information stored in each page may be information as is known in the art. As an example, the information in page $432_1$ may include executable code 434A associated with a component to implement some portion of the functions in the namespace. Page $432_2$ may include executable code 434B, which may implement a second portion of the functions in the namespace. Though not expressly illustrated, the pages associated with each of the loaded components may contain different or additional types of information. For example, memory structures storing variables accessed by the components as they execute and other information may similarly be stored in the pages allocated for each loaded component.

FIG. 4 illustrates a way in which inefficiencies may be avoided using a map as described above. In the simple example of FIG. 4, each loaded component is allocated one page of memory. Any number of pages may be allocated for any component. However, in the embodiment illustrated, a page is the smallest unit of memory that may be allocated for a component. Each component is unlikely to require an amount of memory that is an even multiple of a page. Accordingly, the memory allocated for each component is likely to contain unused memory. FIG. 4 shows unused memory 436A in page $432_1$ and unused memory 436B in page $432_2$.

The inventors have recognized and appreciated that mapping an API namespace to components as illustrated in FIG. 4 reduces the total amount of unused memory allocated to components that are loaded while still providing flexibility. As a specific example, flexibility could be achieved by having every function within operating system interface set 152 implemented in a separate component. However, as illustrated in FIG. 4, for every component loaded, there may be unused memory, such as unused memory 436A and 436B. By increasing the number of components that need to be loaded to implement an API namespace, the total amount of memory increases. However, as has been described above, incorporating a mapping capability into an operating system allows flexibility in the manner in which API namespaces are implemented with less unused memory wasted. The mapping capability may also improve performance of the framework over time by reducing the time spent on disk access in successive versions of the framework. As experience allows identification of the most commonly used namespaces, the components of the framework can be reorganized to include the components implementing those namespaces in the same or a small number of components. However, the mapping capability avoids the need to change applications or other components interacting with the framework.

Figure 5:
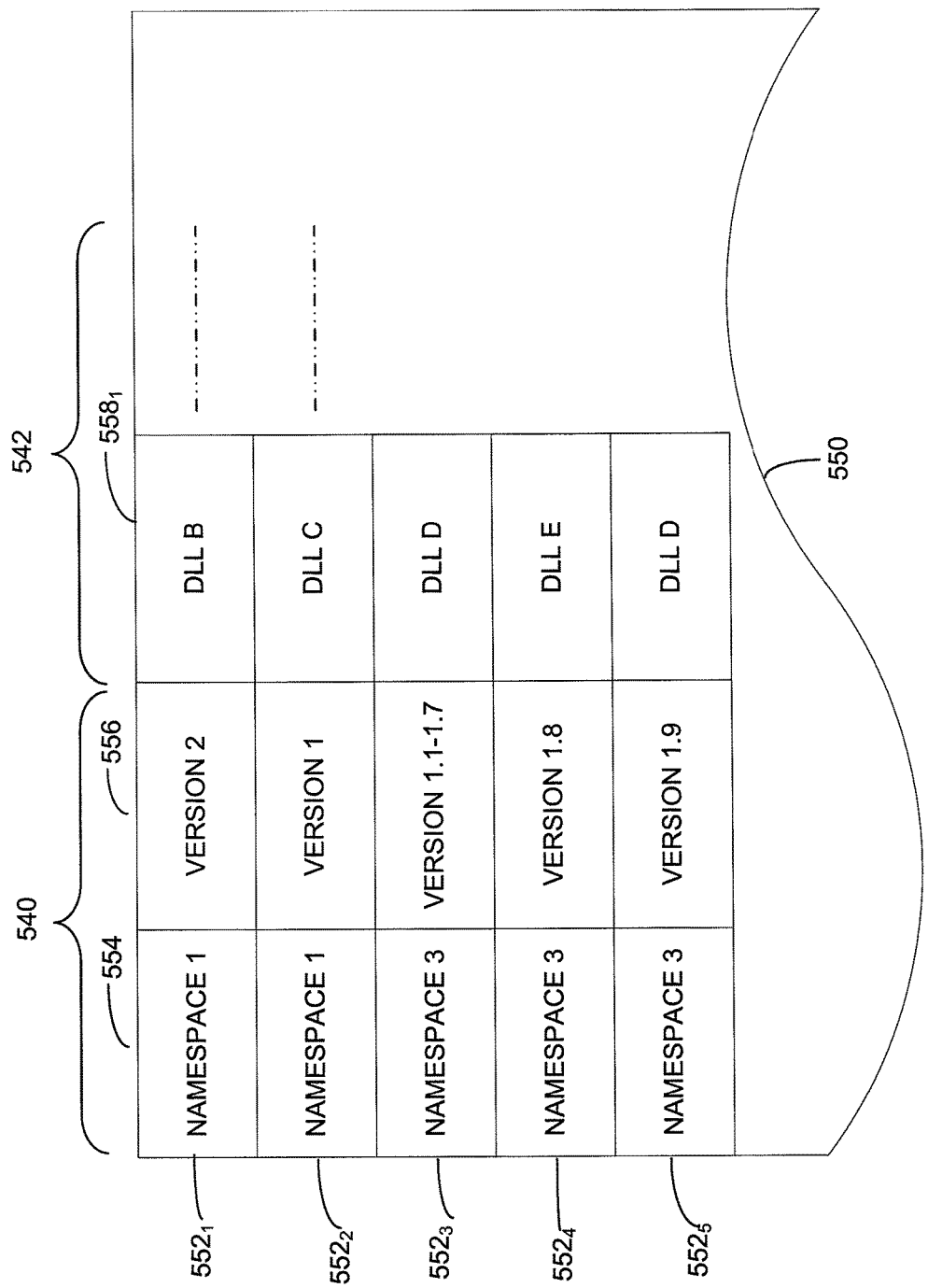
FIG. 5 is a sketch of a map according to some embodiments of the invention.

The example of FIG. 4, illustrates a relatively simple map 450. In this example, not all of the possible input parameters are used in resolving an API namespace to a set of components that collectively implement the interfaces of the namespace. In other embodiments, more complex maps may be present, allowing an API namespace to be resolved to different sets of components in different environments so that different behaviors for functions within the API namespace may be provided in different circumstances. FIG. 5 illustrates as an example, a map that identifies components implementing a namespace based on more parameters than map 450 (FIG. 4).

Map 550 is shown, like map 450, containing information organized in rows and columns. In this example, map 550 contains a namespace identification portion 540 and a component identification portion 542. In any of the rows $552_1$ . . . $552_5$, the namespace identified in namespace identification portion 540 resolves to the components identified in component identification portion 542 in the same row.

In this example, namespace identification portion includes columns 554 and 556. Column 554 includes names or other identifiers for namespaces that may be resolved. Column 556 includes version information associated with each namespace. By identifying namespaces by both name and version number, different versions of the same namespace may be resolved to different sets of components. Which set is resolved may be determined based on a version identifier within parameters 412.

The version identifier may be derived in any suitable way. In the example of FIG. 1, dependency information $126_1$, $126_2$, and $126_3$, associated with dynamically linked libraries $122_1$, $122_2$, and $122_3$, in addition to identifying a namespace by name, may also identify a version number against which that dynamically linked library was developed. When a dynamically linked library triggers the need for components implementing a namespace to be loaded, the version identifier for the namespace may be passed to the loader along with the name of the namespace. This information allows the loader to load a different set of components to implement different versions of the framework, ensuring proper operation of the components that consume the API namespace.

For example, rows $552_1$ and $552_2$ of 550 illustrate that different versions of a namespace, identified as NAMESPACE 1, may be implemented by different components. Row $552_1$ illustrates that version 2 of that namespace may be implemented by a component DLL B. In contrast, row $552_2$ illustrates that version 1 of that namespace may be implemented by a component DLL C. In this case, a functional change may warrant creating a new version of the namespace which provides different behaviors, as indicated by a change in the major version number from 1 to 2.

Even when there are not major functional changes in the framework, incorporating versioning in the map may ensure that the framework provides the intended behaviors as minor changes are made to the components that implement the framework. Rows $552_3$, $552_4$ and $552_5$ illustrate that relatively minor changes, indicated by minor version numbers, may nonetheless result in different behaviors that may disrupt operation of components that consume the namespace. However, by appropriately constructing the map, such disruption can be avoided.

In this example, rows $552_3$, $552_4$ and $552_5$ illustrate that a namespace NAMESPACE 3 has gone through a series of nine minor revisions, which are identified as versions 1.1 to 1.9. Row $552_5$ illustrates that the latest version, version 1.9, of namespace NAMESPACE 3 is implemented with a component DLL D. When a component consuming namespace NAMESPACE 3 that was developed using this latest version indicates that the components implementing NAMESPACE 3 are to be loaded, DLL D is loaded.

Map 550 also indicates that one of the components implementing version 1.8 exhibited a different behavior than the other versions. Accordingly, as shown in row $552_4$ of map 550, if an application or other component consuming NAMESPACE 3 was developed against version 1.8 of NAMESPACE 3, it is executed using components implementing version 1.8 of NAMESPACE 3. In this example, the namespace is implemented using a component identified as DLL E.

Versions 1.1-1.7 of NAMESPACE 3, as indicated in row $552_3$, all implement the same behavior, which is the same as that exhibited by the most recent version 1.9. Accordingly, versions 1.1-1.7 may all resolve to the same component, DLL D, which is the same used in implementing the most recent version of NAMESPACE 3.

FIG. 5 illustrates schematically that different versions of a namespace may resolve to different components. The relationship between versions and components implementing those versions is shown using multiple rows in a table. It should be appreciated that any suitable schema may be used for storing information that represents this information.

It should also be appreciated that FIG. 5 is a simplified illustration of the nature and amount of information that may be included in a map. Only one column $558_1$ is shown within component identification portion 542. However, any number of components may be associated with any version of a namespace. Moreover, other variations in the nature of information stored in a map are possible.

Figure 6:
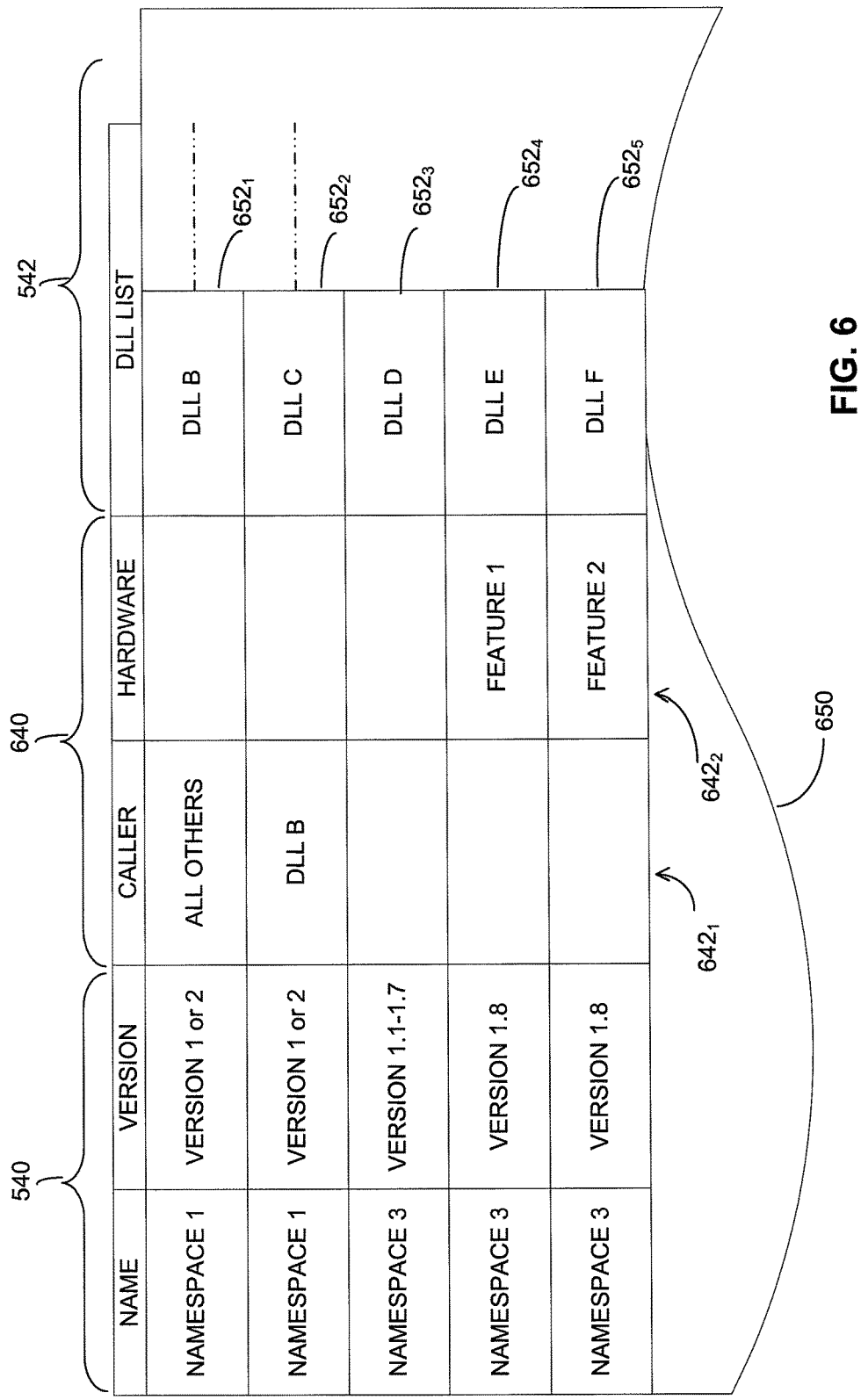
FIG. 6 is a sketch of a map according to some alternative embodiments of the invention.

FIG. 6 illustrates a map that may be used in yet other embodiments. As in the examples of FIGS. 4 and 5, map 650 includes multiple rows, of which rows $652_1$, $652_2$, $652_3$, $652_4$ and $652_5$ are shown. As with map 550, map 650 includes a namespace identification portion 540 and a component identification portion 542. Map 650 additionally includes a runtime parameter portion 640.

Runtime parameter portion 640 contains information indicating runtime conditions under which the relationship between components and a namespace defined in any of the rows applies. In this example, runtime parameter portion 640 includes columns $642_1$ and $642_2$. Column $642_1$ may contain information identifying a caller and column $642_2$ may contain information identifying a hardware environment. In this context, the caller may identify the component that triggers loading of components that implement a namespace.

A loader may obtain information about the caller of an API namespace in conjunction with an indication that a namespace is to be resolved or in any other suitable fashion. The loader then can select components that are appropriate for that caller, as reflected in the map 650. Incorporating caller identification allows a framework to provide different behaviors to different applications or other components that consume a namespace. For example, as illustrated in rows $652_1$ and $652_2$, when NAMESPACE 1 is to be resolved, in all cases, except when called from DLL B, DLL B is loaded. However, if a subsequent indication to resolve NAMESPACE 1 is received from DLL B, the namespace resolved to a different set of components, indicated as DLL C. This capability allows chaining of components, as described in greater detail in conjunction with FIG. 8, below.

The hardware identifier allows the framework to provide different behaviors for a function in different hardware environments or to provide functions that provide the same behaviors differently in different hardware environments. The loader may obtain information about the hardware environment in which it is executing from other operating system utilities or in any other suitable way. By selecting components to resolve an API namespace based on the hardware environment in which the framework executes, behavior of the framework can be tailored for the environment. This capability may allow functions to exhibit different behaviors in different environments or to be implemented differently in different environments to take advantage of hardware capabilities. For example, as illustrated in rows $652_3$, $652_4$ and $652_5$, when NAMESPACE 3 is to be resolved, versions 1.1-1.7 may resolve to DLL D. Version 1.8 may resolve to either DLL E or DLL, depending on the environment. DLL E may be loaded when the platform is running in an environment with FEATURE 1, but DLL F may be loaded when the platform is running in an environment with FEATURE 2.

As an example of how such flexibility may be employed, it may be desirable to implement functions involving display of information differently when executed on a portable computing device than when executed on a desktop computer. As another example, it may be desirable to implement a function involving a math operation differently in an environment that includes a coprocessor than in one that does not. By including runtime parameter portion 640 in map 650, different components can be loaded to implement the functions of a namespace to achieve the desired behaviors for different callers, different hardware configurations or any other runtime parameters. This capability enables a component to consume the contract and allows the implementation to change transparently based on the map and runtime. A component consuming a namespace need not test for and use a different API based on processor availability, and a single implementation need not have branches to detect feature availability and choose the correct implementation.

Figure 7:
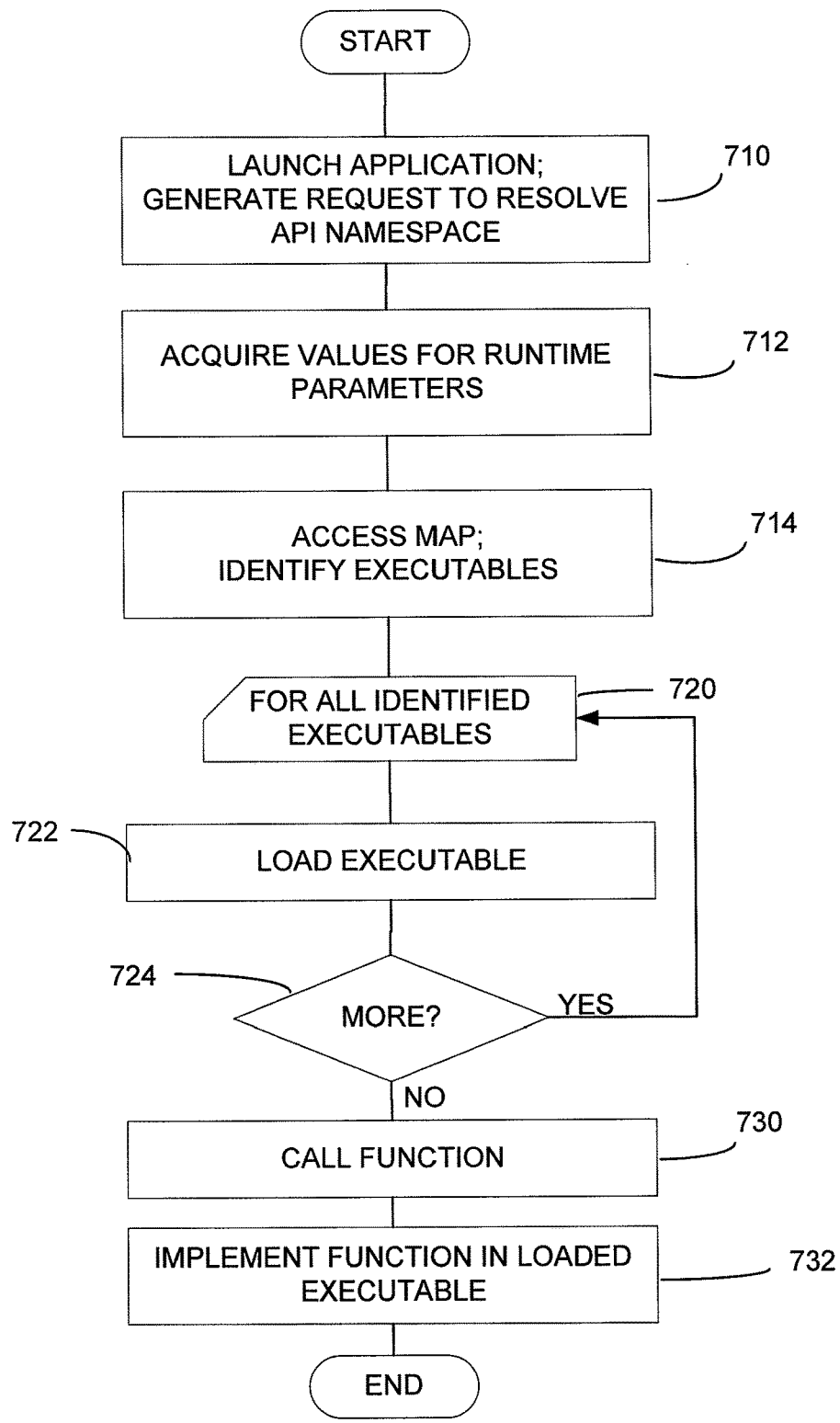
FIG. 7 is a flow chart of a method of operation of a computer system according to some embodiments of the invention.

Turning to FIG. 7, an example is provided of a process by which a loader including a map as described above may be used in operation of a computing system. The process of FIG. 7 begins with an event that triggers an indication that a namespace is to be resolved. Any suitable event may trigger resolution of a namespace. In the example of FIG. 7, the process begins at block 710 where an application is launched. The application may contain dependency information identifying one or more namespaces consumed by the application. Launching the application may then trigger an indication to the loader to load components implementing that namespace.

Though, it should be appreciated that the components need not be loaded at any set time relative to launching the application. Rather, the processing in block 710 may be completed during execution of the application, when execution of the application reaches a point that a function provided by the API namespace will be called or at any other suitable time. Further, it should be appreciated that launching an application is just one example of a triggering event. A call to a utility to load a library within the operating system or any other suitable event could give rise to resolution of a namespace.

Regardless of when the processing of block 710 is completed, it may be performed in any suitable way. For example, it may be performed by or under control of components of an operating system that are implemented using techniques as known in the art for triggering the loading of dependent dynamically linked libraries. Though, in some embodiments, those components may also supply to the loader, in connection with an identification of the namespace, the identity of the caller—which in this case is the component that consumes the namespace.

When a namespace is to be resolved, the process may continue to block 712. At block 712, runtime parameters may be acquired. These parameters may be acquired in any suitable way. For example, a loader may be configured to acquire these parameters from other operating system utilities. Alternatively or additionally, a component that indicates to the loader that a namespace is to be resolved by collecting these parameters and pass them to the loader in conjunction with the indication.

Regardless of how the parameters are collected, once they are collected, the loader may identify executable components that implement the namespace to be resolved. In embodiments as described above, the loader may identify these components from a map stored as a data structure in computer memory. Though, the specific mechanism by which a set of components is identified is not critical to the invention.

Once the set of components is identified, the process of FIG. 7 may implement a loop over blocks 720, 722 and 724 for all of the identified executables. At block 722, the identified executable is loaded. Processing at block 722 may be performed using techniques as are known in the art. Each executable loaded, for example, may be loaded using techniques known for loading dynamically linked libraries. Though, any suitable loading techniques may be used.

At decision block 724, the process may loop back to block 720 until all of the executables that implement the identified namespace are loaded. When the loop is completed, regardless of the number of executables used to implement the namespace, components that implement all of the APIs are loaded such that the application can call the functions of the namespace.

Accordingly, the process of FIG. 7 may proceed to block 730 where a call to a function in the namespace may be made. Such a call may be made from an application program or other component consuming the namespace. The call can be appropriately processed at block 732, using the executables loaded as a result of resolving the namespace. Though, the execution will result in the function being executed with a behavior determined by the mapping of the namespace to specific components used to resolve the namespace.

Figure 8:
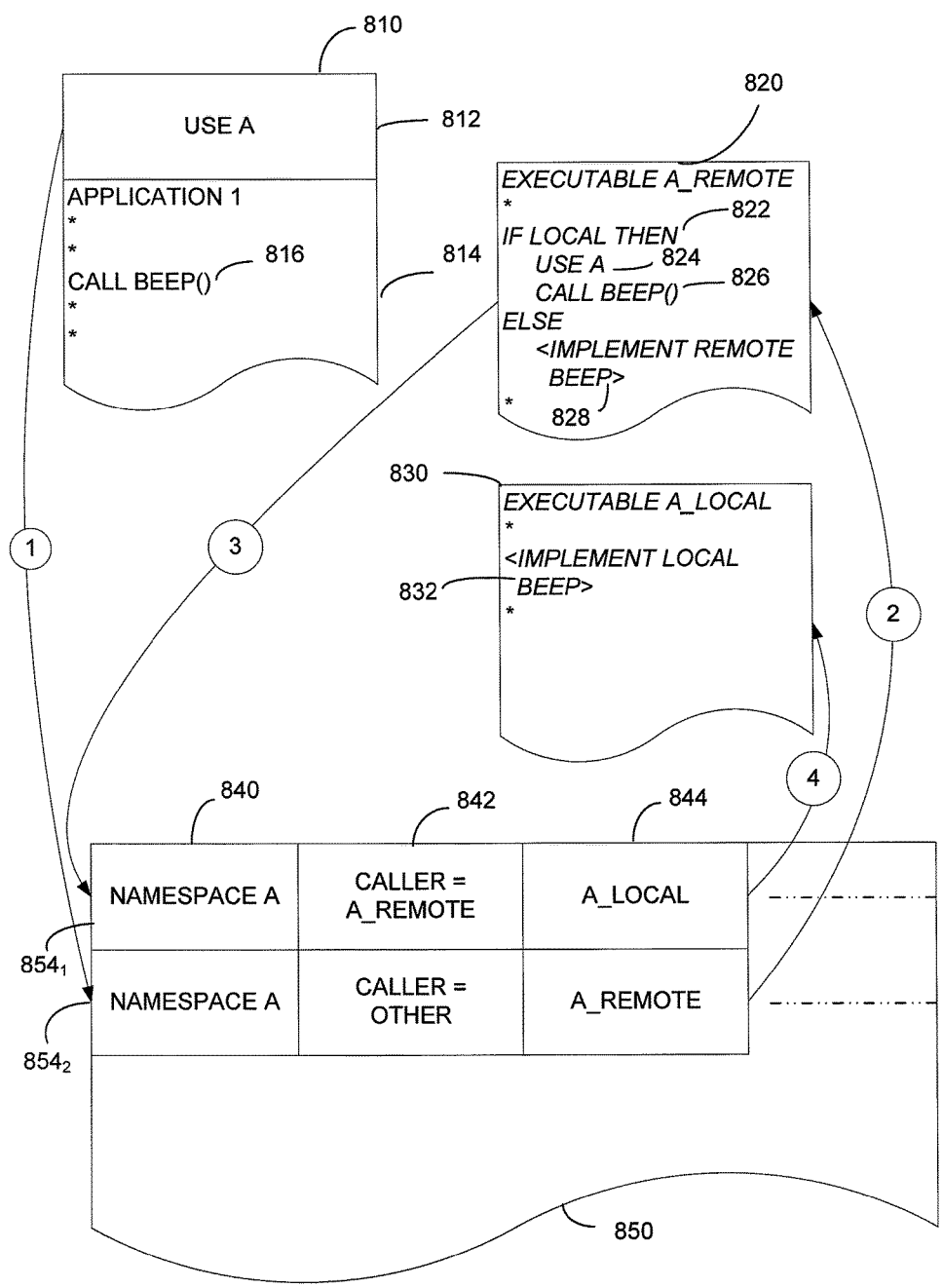
FIG. 8 is a diagram illustrating interaction of components for layering of components in a framework.

Turning now to FIG. 8, an example of which this process may be used to implement chaining is provided. Chaining allows layers to be added to a framework to implement different functions or augmented versions of the same functions in different environments. Yet, each added layer can rely on lower level layers without having to implement all the functionality of the lower layers.

FIG. 8 illustrates a component 810 that may be part of an application. Components 820 and 830 may be components of an operating system. Component 820 is here shown as a component in a higher level of the operating system than component 830. These components may implement the same interface contract, in the same way that dynamically linked libraries 160A and 170A implement the same interface contract. In this example, component 820 may be present only in configurations of the framework intended to support execution in a remote mode. Component 830 may be present in both versions of the framework configured for local and for those configured for remote operation. One or both of these components may be used to implement functions called from component 810, depending on the configuration of the framework and operating environment.

Component 810 includes a dependency portion 812, indicating that the component 810 was developed against a namespace A. Namespace A can be resolved to component 820 or 830. The resolution of namespace A may depend on the configuration of the framework and the map associated with that configuration. In the scenario illustrated in FIG. 8, map 850 initially maps namespace A to component 820. This mapping can be seen in row 854₂.

Column 840 identifies a namespace to be resolved. Column 842 identifies a caller and column 844 identifies the component to which the namespace resolves. Based on caller information in the map, row 854₂ identifies the appropriate component as the component identified as A_RE-MOTE, corresponding to component 820, when the caller is any component other than component A_REMOTE.

Code portion 814 of component 810 contains code that calls a function 816, BEEP, in this example. The function BEEP may be a function defined by the interface contract for namespace A. Accordingly, when function 816 is called while component A_REMOTE is loaded, the function BEEP within component 820 is invoked.

Component 820 includes multiple instructions 822, 824, 826 and 828 to implement the function BEEP. These instructions cause different behavior depending on whether the framework is operating in local or remote mode. Instruction 822 tests for the operating mode and causes instruction 824 and 826 to be executed in a local mode and instruction 828 to be implemented in remote mode.

Instruction 828 represents one or more instructions that cause the system on which component 820 is built to cause a remote device to generate a beep. Such an instruction, for example, may generate network messages representing a remote beep command or implement the function in any suitable way.

When the framework illustrated in FIG. 8 is configured for use on a local machine, an instruction such as instruction 828 is not required. Accordingly, component 830 includes no comparable instruction. Rather, component 830 includes an instruction 832 that generates a beep on a local machine executing the framework. Instruction 832, for example, may make a call to a hardware component that drives a speaker on the hardware device.

Though, the framework when configured to include component 820, includes the capability to execute remote operations, it may be desirable to allow the same framework configuration to support local operation. Accordingly, component 820 includes the capability to distinguish between when it is in a framework operating in local mode and when it is in remote mode. This capability is provided by instruction 822. As noted above, when operating in local mode, instructions 824 and 826 are executed. In this example, instruction 826 triggers the same behavior as instruction 832 in component 830. Accordingly, the overall size of the framework may be reduced if it were possible to allow component 820 to place a call to the implementation of the BEEP function in component 830.

Though component 820 as loaded to implement the BEEP function, it is possible for component 820 to call the same function as implemented in component 830 by using caller information in map 850. Row $854_1$ indicates that when NAMESPACE A is to be resolved to support a call from component A_REMOTE, component A_LOCAL, corresponding to component 830, is loaded. In this example, instruction 824, indicating that NAMESPACE A is to be used, triggers resolution of NAMESPACE A, causing a determination that component 830 is to be loaded. Consequently, the call to function BEEP at instruction 826 results in code within component 830 being invoked to implement a local beep.

In this way, execution can be chained through components at different layers of the framework. A function call may initially be routed to a component in a higher layer of the framework. Rather than duplication code of a lower layer to perform the same function, the map may specify that when a component at a higher level requires that a namespace be resolved, it be resolved to a component at a lower layer. With such chaining, functionality can be added or modified by adding layers, while limiting the overall size of the code used to implement the framework. Such an approach may provide a more compact framework, in terms of code size and data footprint, in comparison to an alternative implementation relying on an extension point and knowledge of the extension point in the local implementation to handle e.g., a remote caller, and some way to register the implementation of the extension point with the component.

Having thus described several aspects of at least one embodiment of this invention, it is to be appreciated that various alterations, modifications, and improvements will readily occur to those skilled in the art. For example, the map does not necessarily be global. There may be a schema per process, or layered schema. The latter would be useful for process level scoping of some namespaces. As an example, a minor version update by default may share the implementation with the previous version so existing applications get the benefit of the higher performance, more secure, and/or more reliable behavior. However, if some application has a severe compatibility issue an overlay map can be used to point that one namespace back to the old implementation, for instance. FIG. 4 illustrates a map 450 is overlaid on a map 451, which may define additional relationships between namespaces and components implementing those namespaces. Map 451 may be used in resolving namespaces to components, to the extent not superseded by map 450.

Likewise, the map need not be a static. In other words it could be runtime extended if desired by third parties or dynamically added components. (such as a hardware feature enlightened implementation of a namespace).

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed on a computing device that includes at least one processor and memory, the method comprising:
    receiving, by the computing device from a component that was coded against an interface contract that corresponds to an application programming interface ("API") namespace, a request to load the API namespace that represents a predefined collection of functions that fulfill the interface contract, where the received request includes parameters that identify: the API namespace, a particular version of the API namespace required by the component, and the component;
    identifying, by the computing device based on the parameters and a map, a set of components that implement the predefined collection of functions represented by the particular version of the API namespace, where the interface contract is decoupled from the set of components, where the interface contract defines APIs of the predefined collection of functions, and where the map links the particular version of the API namespace to the set of components that implements the predefined collection of functions that fulfill the interface contract; and
    loading the identified set of components.

2. The method of claim 1 the identifying further based on a runtime parameter that indicates a configuration of a runtime environment of the computing device.

3. The method of claim 2 where the runtime parameter comprises an identification of a hardware capability of the computing device.

4. The method of claim 1, where:
    the received request is a first request that the API namespace is to be loaded;
    the component is a first component;
    the loaded set of components comprises a first set of components; and
    the method further comprising:
        in response to receiving a second request to load the API namespace:
            identifying, based on the parameters and the map, a second set of components that implements other functions that fulfill the interface contract; and
            loading the identified second set components.

5. The method of claim 4 further comprising:
    receiving a call through an interface implemented by the loaded first set of components;
    determining, in response to the received call, whether a function is to be implemented according to computer executable instructions in the loaded first set of components according to computer executable instructions in the loaded second set of components; and
    executing, in response to the received call, the implemented function.

6. The method of claim 1 wherein the set of components comprises a plurality of dynamically linked libraries, and wherein the loading comprises loading the plurality of dynamically linked libraries.

7. The method of claim 1, further comprising dynamically modifying the map.

8. At least one computer memory storing computer-executable instructions that, based on execution by at least one computing device, configure the at least one computing device to:
    receive, from a component that was coded against an interface contract that corresponds to an application programming interface ("API") namespace, a request to load the API namespace that represents a predefined collection of functions that fulfill the interface contract, where the received request includes parameters that identify: the API namespace, a particular version of the API namespace required by the component, and the component;
    identify, based on the parameters and a map a, a set of components that implement the predefined collection of functions represented by the particular version of the API namespace, where the interface contract is decoupled from the set of components, where the interface contract defines APIs of the predefined collection of functions, and where the map links the particular version of the API namespace to the set of components that implements the predefined collection of functions that fulfill the interface contract; and
    load the identified set of components.

9. The at least one computer memory of claim 8, where the map comprises a value for at least one runtime parameter associated with the interface contract.

10. The at least one computer memory of claim 8, where the map is further configured for linking each of a plurality of versions of the API namespace to a respective set of components.

11. The at least one computer memory of claim 8, where the identifying is further based on a current hardware configuration.

12. The at least one computer memory of claim 8, where the map further links at least two interface contracts to a same set of components, and where the identified set of components comprises at least one of a plurality of dynamically linked libraries.

13. The at least one computer memory of claim 8 where the identifying is further based on a current hardware configuration.

14. A computing device comprising:
   at least one processor;
   memory; and
   at least one program module according to which the computing device is configured to:
      receive, from a component that was coded against an interface contract that corresponds to an application programming interface ("API") namespace, a request to load the API namespace that represents a predefined collection of functions that fulfill the interface contract, where the received request includes parameters that identify: the API namespace, a particular version of the API namespace required by the component, and the component;
      identify, based on the parameters and a map a, a set of components that implement the predefined collection of functions represented by the particular version of the API namespace, where the interface contract decoupled from the set of components, where the interface contract defines APIs of the predefined collection of functions, and where the map links the particular version of the API narnespace the set of components that implements the predefined collection of functions that fulfill the interface contract; and
      load the identified set of components.

15. The computing device of claim 14 further configured to:
   execute a first component of the set of components;
   determine, based on the executing, that a function is to be performed that is not in the set of components,
   request, based on determining that a function is to be performed that is not in the set of components, a second request to load a second API namespace;
   identify, based on the map and in response to the second request, a second set of components that implements the function that is not in the set of components and that fulfills an interface contract of the second API namespace; and
   load the identified second set of components.

16. The computing device of claim 14 where the map is associated with an operating system of the computing device.

17. The computing device of claim 16, where the map comprises a plurality of linkages that each link a namespace with a set of components, where at least some of the linkages are based on one or more runtime parameters.

18. The computing device of claim 17, where the one or more runtime parameters comprise a hardware capability of the computing device.

* * * * *